(No Model.)

G. A. BLANCHARD.
BUTTER WORKER.

No. 254,088. Patented Feb. 21, 1882.

Witnesses.
John F. C. Prinkert
B. J. Noyes.

Inventor:
George A. Blanchard
by Crosby & Gregory
Attys.

UNITED STATES PATENT OFFICE.

GEORGE A. BLANCHARD, OF CONCORD, NEW HAMPSHIRE.

BUTTER-WORKER.

SPECIFICATION forming part of Letters Patent No. 254,088, dated February 21, 1882.

Application filed November 7, 1881. (No model.)

*To all whom it may concern:*

Be it known that I, GEORGE A. BLANCHARD, of Concord, in the county of Merrimack and State of New Hampshire, have invented an Improved Butter-Worker, of which the following description, in connection with the accompanying drawings, is a specification.

This invention has for its object the production of a simple and efficient machine for removing buttermilk from butter, the machine having a vibrating segmental presser co-operating with either a like movable segmental or a flat bed.

In other so-called "butter-workers," wherein the buttermilk is removed by a grinding motion, as when fluted rollers are employed, or by a sliding motion, as when a lever is pushed or forced through the butter, or by a roller carried by a sliding frame, the said roller being rolled over the butter, the mass of butter lies on a fixed bed or table, and may be easily injured in its texture by overworking, and with them the buttermilk is not positively forced out, and must generally be taken up or absorbed by a cloth or sponge. Furthermore, I am aware that butter-workers are old in which two plane-surfaced rollers, or one plane and the other fluted, or two fluted rollers on fixed axes geared together, are employed.

In my plan the segmental pressing-surface is pivoted and the bed movable, and the two so located with relation to each other and so operated that the milk in the butter after churning is removed by very strong direct pressure on the butter, and the milk as it exudes from the butter is free to and must fall by gravity into a proper receptacle below.

Figure 1:
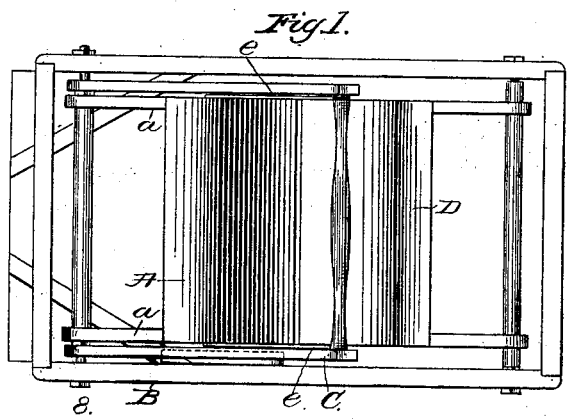
Figure 2:
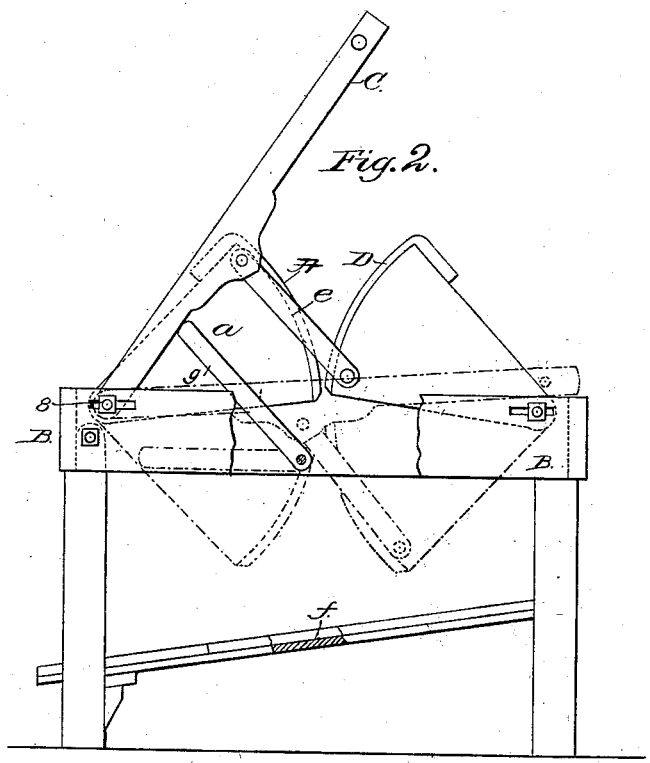

Figure 1 represents in top view a butter-worker containing my improvement; and Fig. 2, a side elevation thereof, the dotted lines showing the parts in a different position, a part of the frame-work being broken away to better show the presser and bed.

The presser A is composed of what may be called a broad "segmental-faced lever," the side arms, *a*, of which are adjustably pivoted upon the supporting frame-work B. The length of the face of the presser will preferably be about or less than a quarter of a circle.

The presser as herein shown has attached directly to it a handle or hand-piece, C, by which to actuate the presser and vibrate or reciprocate it.

The movable bed D, opposed to the presser, is herein shown made as a counterpart of the presser A, and connected with and actuated by the presser through suitable connecting devices, herein shown as links *e e*, I having selected them as the most simple form of connection known to me. The links *e*, two being used, are each pivoted at one end to the presser and at its other end to the bed, the device used to pivot the links to the presser also serving to attach the handle to said presser.

As the presser is moved from its full to its dotted line position, Fig. 2, and vice versa, the bed D will be moved in unison with it in the same general direction, thus producing on the butter a direct pressure rather than a sliding pressure, which would result were the bed stationary.

The butter will be introduced in moderate quantities between the presser and bed in their elevated or open full-line position, Fig. 2, and on depressing the presser the butter will be pressed between the two moving surfaces of the presser and bed, and will pass in a sheet to the inclined shelf *f* below, or to some other suitable receptacle.

The thickness of the sheet of butter and the amount of pressure exerted thereon will depend upon the amount of space left between the moving surfaces of the presser and bed, and this space may be regulated by adjusting the fulcrum or center 8 of the presser.

The butter, subjected only to a direct and powerful pressure, causes the buttermilk to exude, and the same liberated is permitted to and compelled to fall by gravity upon the inclined shelf *f*, from which it is permitted to flow into some suitable receptacle.

Instead of the segmental bed D, it is obvious that I might with good results employ a flat surface held and made movable in suitable guideways in unison with the presser.

When the presser is elevated it may be held in such position by a suitable stop, *g*.

I claim—

1. The movable bed and the pivoted segmental presser connected and adapted to move with it, substantially as described, combined with the handle attached directly to the presser, to operate the said parts in one and then in the opposite direction in unison, substantially as specified.

2. The pivoted segmental presser and handle and movable bed, combined with the links e, each pivoted at one end to the presser and at its other end to the bed, to thus cause the presser and bed to travel together in the same direction, substantially as described.

In testimony whereof I have signed my name to this specification in the presence of two subscribing witnesses.

GEORGE A. BLANCHARD.

Witnesses:
 GEO. W. GREGORY,
 B. J. NOYES.